(12) United States Patent
Kitazawa et al.

(10) Patent No.: US 9,746,074 B2
(45) Date of Patent: Aug. 29, 2017

(54) VEHICLE TRANSMISSION APPARATUS

(71) Applicant: AISIN AW CO., LTD., Anjo-shi, Aichi-ken (JP)

(72) Inventors: Yusuke Kitazawa, Nagoya (JP); Kohei Tsuda, Nishio (JP)

(73) Assignee: AISIN AW CO., LTD., Anjo (JP)

( * ) Notice: Subject to any disclaimer, the term of this patent is extended or adjusted under 35 U.S.C. 154(b) by 69 days.

(21) Appl. No.: 14/356,513

(22) PCT Filed: Jan. 25, 2013

(86) PCT No.: PCT/JP2013/051608
§ 371 (c)(1),
(2) Date: May 6, 2014

(87) PCT Pub. No.: WO2013/111861
PCT Pub. Date: Aug. 1, 2013

(65) Prior Publication Data
US 2014/0309898 A1 Oct. 16, 2014

(30) Foreign Application Priority Data

Jan. 26, 2012 (JP) ................................ 2012-014378

(51) Int. Cl.
*B60W 10/06* (2006.01)
*B60W 30/18* (2012.01)
(Continued)

(52) U.S. Cl.
CPC ............ *F16H 61/061* (2013.01); *B60W 10/06* (2013.01); *B60W 10/115* (2013.01);
(Continued)

(58) Field of Classification Search
CPC ........ F16D 48/02; F16D 48/062; F16D 48/08; F16D 2500/1066; F16D 2500/3024;
(Continued)

(56) References Cited

U.S. PATENT DOCUMENTS 6,508,346 B1 *   1/2003   Simpson ................ 192/3.3
7,003,388 B2 *   2/2006   Nakamura .............. 701/67
(Continued)

FOREIGN PATENT DOCUMENTS

JP   Y-53-5984       2/1978
JP   A-2004-278767   10/2004
(Continued)

OTHER PUBLICATIONS

International Search Report issued in International Application No. PCT/JP2013/051608 mailed May 7, 2013.

*Primary Examiner* — Terry Chau
(74) *Attorney, Agent, or Firm* — Oliff PLC

(57) ABSTRACT

A vehicle transmission apparatus having a starting engagement friction element, which has friction plates and a hydraulic servo including a piston that is moved according to a supplied oil pressure to press the friction plates, which is controlled to be engaged when a vehicle is started by using at least a driving force of the internal combustion engine, and which transfers creep torque. A control device capable of receiving an accelerator operation amount signal and capable of outputting a command value that controls the oil pressure. The control device executes temporary increase control of temporarily increasing the command value, when the accelerator operation amount signal is turned on from a state where the accelerator operation amount signal is off and the command value is output so that the starting engagement friction element transfers the creep torque.

6 Claims, 12 Drawing Sheets

(51) Int. Cl.
  F16D 48/02    (2006.01)
  F16D 48/08    (2006.01)
  F16H 61/06    (2006.01)
  B60W 10/115   (2012.01)
  F16H 61/686   (2006.01)
  F16D 48/06    (2006.01)
  B60W 20/00    (2016.01)
  B60W 20/30    (2016.01)

(52) U.S. Cl.
  CPC *B60W 30/18027* (2013.01); *B60W 30/18063* (2013.01); *F16D 48/02* (2013.01); *F16D 48/062* (2013.01); *F16D 48/08* (2013.01); *F16H 61/686* (2013.01); *B60W 20/00* (2013.01); *B60W 20/30* (2013.01); *B60W 2540/10* (2013.01); *B60W 2710/0666* (2013.01); *F16D 2500/1026* (2013.01); *F16D 2500/1045* (2013.01); *F16D 2500/1066* (2013.01); *F16D 2500/3024* (2013.01); *F16D 2500/3025* (2013.01); *F16D 2500/3056* (2013.01); *F16D 2500/30415* (2013.01); *F16D 2500/30425* (2013.01); *F16D 2500/30803* (2013.01); *F16D 2500/3101* (2013.01); *F16D 2500/3144* (2013.01); *F16D 2500/3166* (2013.01); *F16D 2500/50206* (2013.01); *F16D 2500/50209* (2013.01); *F16D 2500/50212* (2013.01); *F16D 2500/50224* (2013.01); *F16D 2500/5126* (2013.01); *F16D 2500/525* (2013.01); *F16D 2500/7041* (2013.01); *F16D 2500/7044* (2013.01); *F16D 2500/70414* (2013.01); *F16H 2061/062* (2013.01); *F16H 2200/2007* (2013.01); *F16H 2200/2023* (2013.01); *F16H 2312/02* (2013.01); *F16H 2312/06* (2013.01)

(58) Field of Classification Search
  CPC ......... F16D 2500/30; F16D 2500/1026; F16D 2500/1045; F16D 2500/3025; F16D 2500/30415; F16D 2500/30425; F16D 2500/3056; F16D 2500/30803; F16D 2500/3101; F16D 2500/3144; F16D 2500/3166; F16D 2500/50206; F16D 2500/50209; F16D 2500/50212; F16D 2500/50224; F16D 2500/5126; F16D 2500/525; F16D 2500/7041; F16D 2500/70414; F16D 2500/7044; F16H 2061/062; F16H 61/061; F16H 61/686; F16H 2200/2007; F16H 2200/2023; F16H 2312/02; F16H 2312/06; B60W 10/06; B60W 10/115; B60W 30/18027; B60W 30/18063; B60W 20/00; B60W 20/30; B60W 2540/10; B60W 2710/0666
  USPC .............................................. 701/67; 192/3.3
  See application file for complete search history.

(56) References Cited

U.S. PATENT DOCUMENTS

| | | | | |
|---|---|---|---|---|
| 8,924,107 | B2* | 12/2014 | Ichikawa | F16H 61/0021 |
| | | | | 180/336 |
| 9,303,758 | B2* | 4/2016 | Tsuda | B60K 6/48 |
| 2004/0192506 | A1 | 9/2004 | Nakamura | |
| 2010/0204892 | A1* | 8/2010 | Kobayashi et al. | 701/51 |
| 2010/0210415 | A1 | 8/2010 | Eto et al. | |
| 2011/0246036 | A1 | 10/2011 | Tsutsui et al. | |
| 2014/0288754 | A1* | 9/2014 | Kasuya | B60K 6/48 |
| | | | | 701/22 |

FOREIGN PATENT DOCUMENTS

| | | |
|---|---|---|
| JP | A-2007-16933 | 1/2007 |
| JP | A-2009-74579 | 4/2009 |
| JP | A-2010-89584 | 4/2010 |
| JP | A-2011-214643 | 10/2011 |
| JP | A-2011-231807 | 11/2011 |
| JP | A-2012-31892 | 2/2012 |

* cited by examiner

|      | C-1 | C-2 | C-3 | B-1 | B-2 |
|------|-----|-----|-----|-----|-----|
| P    |     |     |     |     |     |
| Rev  |     |     | ○   |     | ○   |
| N    |     |     |     |     |     |
| 1st  | ○   |     |     |     | ○   |
| 2nd  | ○   |     |     | ○   |     |
| 3rd  | ○   |     | ○   |     |     |
| 4th  | ○   | ○   |     |     |     |
| 5th  |     | ○   | ○   |     |     |
| 6th  |     | ○   |     | ○   |     |

DISENGAGED STATE

CREEP STATE

DRIVING-FORCE TRANSMITTING STATE

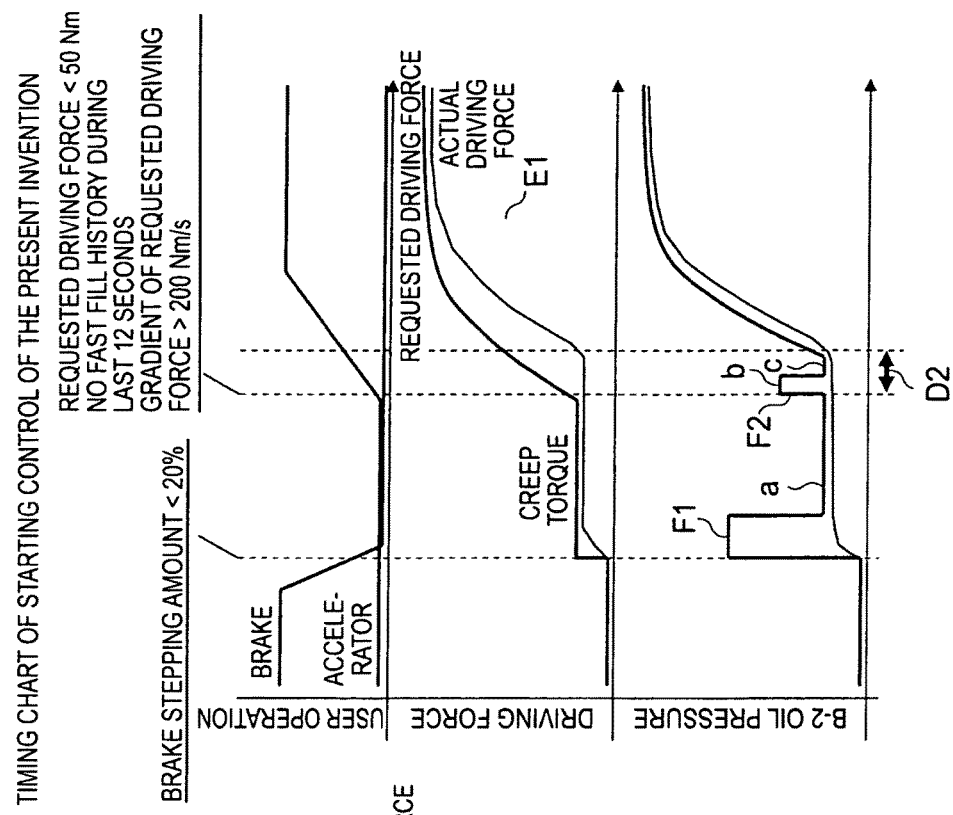
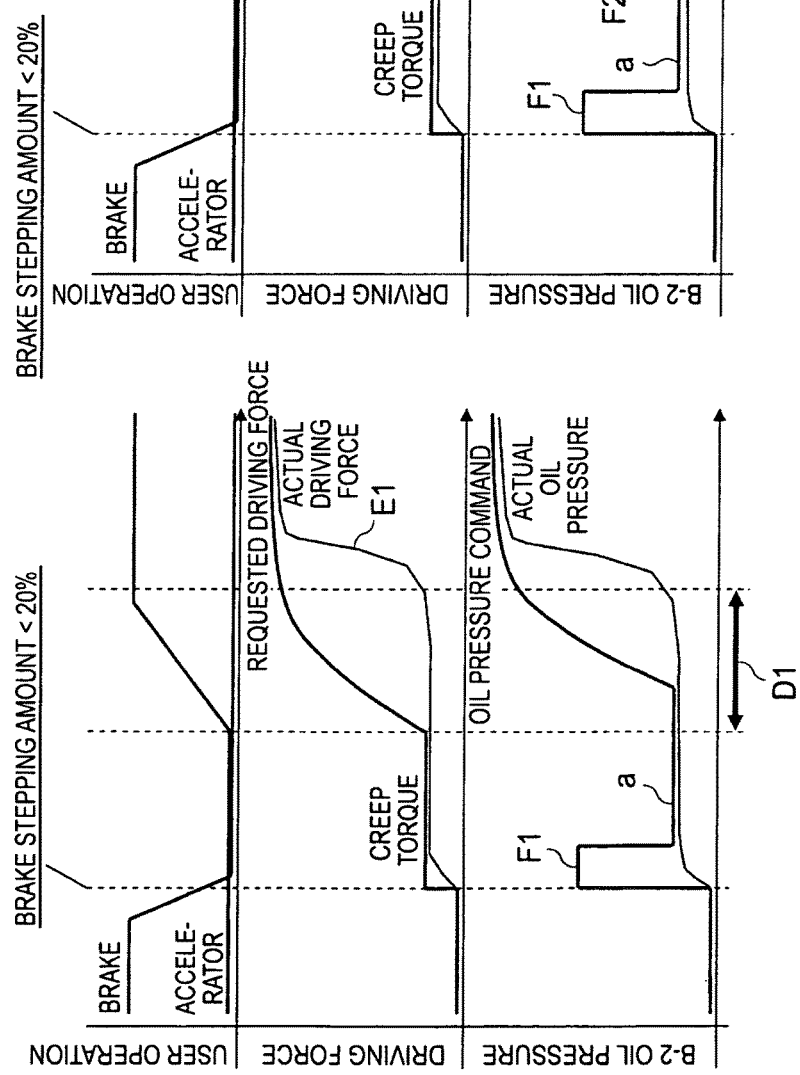

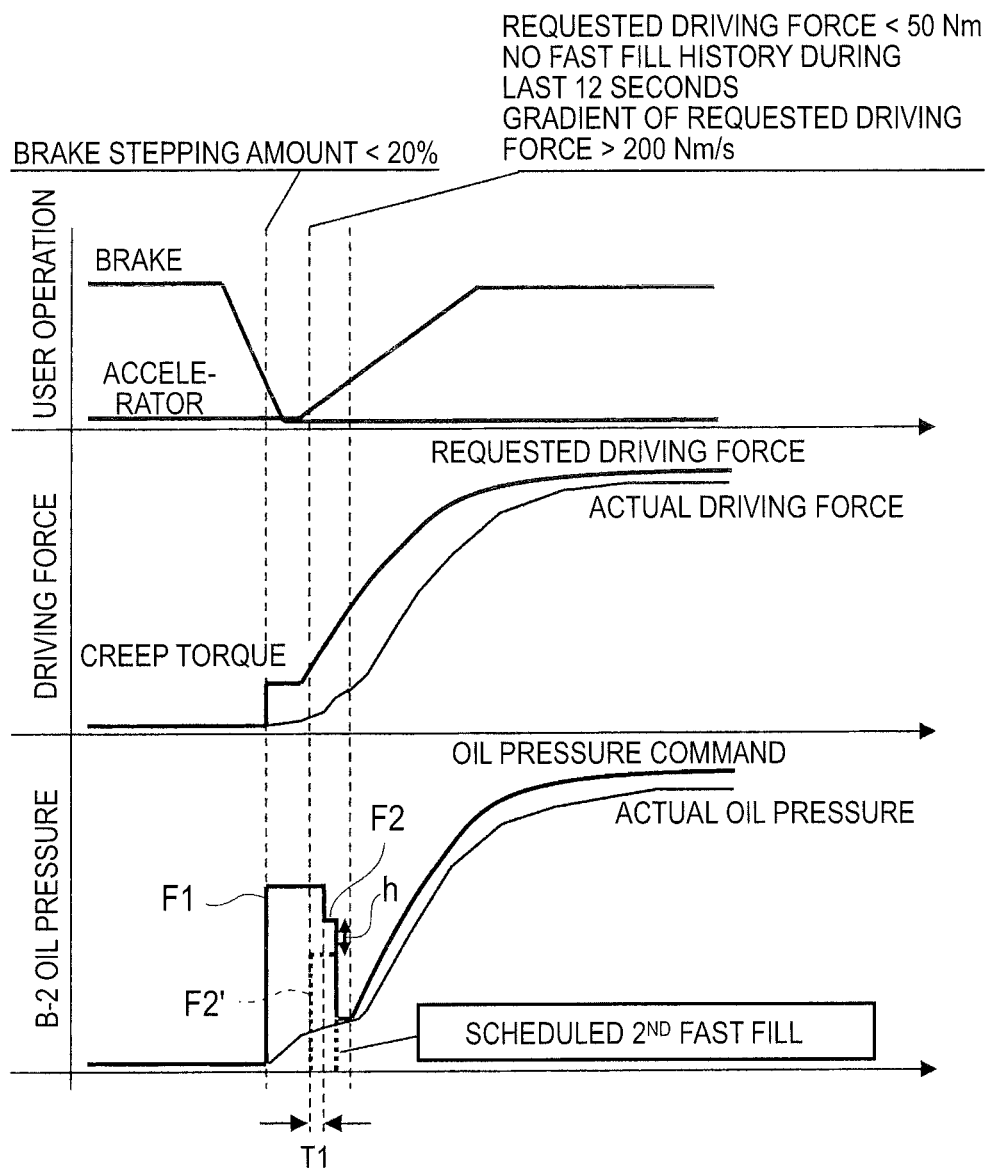

VEHICLE TRANSMISSION APPARATUS

TECHNICAL FIELD

The present invention is preferable as vehicle transmission apparatuses, in particular as hybrid vehicle transmission apparatuses having an engine and an electric motor as driving sources, and more particularly relates to starting control of controlling a starting engagement friction element so as to have creep torque upon starting of a vehicle.

BACKGROUND ART

In vehicle transmission apparatuses, creep torque is typically generated by a torque converter. In transmission apparatuses for hybrid vehicles that are started by an electric motor, the creep torque is generated by the electric motor.

In the case where the vehicle is in such a condition that the creep torque cannot be generated by the torque converter or the electric motor, such as in the case of low battery charge or the case where the electric motor is rotated by an engine to generate electric power in, e.g., a single-motor parallel hybrid vehicle transmission apparatus, the vehicle is started by the engine, and at this time, the creep torque is obtained by slip controlling a B-2 brake as a friction engagement element to be engaged at the first speed.

Control devices of automatic transmissions are conventionally proposed which performs starting control by engaging a lockup clutch to slip control a C-1 clutch to be engaged at the first speed. When a foot brake is switched from ON to OFF, this control device determines that the driver has an intention to start the vehicle, and executes fast fill control of an oil pressure command value for the C-1 clutch. The control device then slip controls the C-1 clutch to generate the creep torque, thereby starting the vehicle. If an accelerator pedal is stepped on to a small operation amount by the driver and a throttle opening is increased, the control device computes torque capacity of the C-1 clutch and increases an engagement pressure of the C-1 clutch so as to achieve the computed torque capacity.

RELATED DOCUMENT

Patent Document

[Patent Document 1] Japanese Patent Application Publication No. 2011-214643 (JP 2011-214643 A) (see, in particular, FIG. 8 and [0055], [0057]).

SUMMARY OF THE INVENTION

Problem to be Solved by the Invention

In Patent Document 1, when an engagement pressure of a C-1 clutch is increased according to a throttle opening with creep torque having been generated by slip control of a C-1 clutch by fast fill, the increase in engagement pressure (supply pressure) for the clutch is used to change the volume of a hydraulic servo, causing delay in increasing transfer torque capacity of the clutch. In particular, in the case where a disc having waves is used as a friction plate (clutch plate), the creep torque is generated in a creep state without flatting the waves. In order that larger torque capacity to be obtained, the waves need to be flattened into a flat plate state. Accordingly, a relatively long piston stroke is required for a piston of the clutch hydraulic servo to move to a stroke end position. An increase in oil pressure is therefore used to change the volume as the piston stroke, causing significant delay of an actual oil pressure with respect to an oil pressure command. An actual driving force is thus delayed with respect to a requested driving force and rises abruptly, generating shock. In particular, in the case where the driver requests acceleration, the larger a change in throttle opening is, the larger the difference between an increase in engine torque and an increase in transfer torque capacity of the clutch is. The driver thus experiences discomfort.

It is an object of the present invention to provide a vehicle transmission apparatus that solves the above problem by executing, in starting control of transferring creep torque by an engagement friction element upon starting of a vehicle, temporary increase control is performed such that a piston is moved to a stroke end position in a hydraulic servo when the vehicle is started from a creep state.

Means for Solving the Problem

A vehicle transmission apparatus according to the present invention is characterized by including: a starting engagement friction element (e.g., B-2), which has friction plates (25, 21) and a hydraulic servo (20) including a piston (30) that is moved according to a supplied oil pressure to press the friction plates, which is placed on a transmission path between an internal combustion engine (E) and wheels (14), which is controlled to be engaged when a vehicle is started by using at least a driving force of the internal combustion engine, and which transfers creep torque that allows the vehicle to creep before the piston reaches a stroke end position; and a control device (U) capable of receiving an accelerator operation amount signal and capable of outputting a command value that controls the oil pressure. In the vehicle transmission apparatus, the control device executes temporary increase control (F2) of temporarily increasing the command value, when the accelerator operation amount signal is turned on from a state where the accelerator operation amount signal is off and the command value is output so that the starting engagement friction element (B-2) transfers the creep torque.

As shown in, e.g., FIG. 4, the "stroke end position of the piston" refers to the position where the piston cannot be substantially stroked even if the oil pressure is supplied to the hydraulic servo, and the vehicle can be started as soon as the friction plates closely contact each other and an engagement pressure is applied (see, e.g., FIG. 4C). The "position before the piston reaches the stroke end position" refers to the position where the friction plates contact each other so as to be able to slip, and generates the creep torque (see, e.g., FIG. 4B). The present invention is preferably applied to friction plates having waves, but is not limited to this. The "accelerator operation amount signal" is not limited to an accelerator opening angle signal. The accelerator operation amount signal is on when driver's operation of requesting a driving force with intent to start the vehicle is detected, and is off in a situation where such an operation cannot be detected.

As shown in, e.g., FIG. 6B, the control device increases the command value (F2) in the temporary increase control from the value (a) as the command to transfer the creep torque to a first predetermined value (b), and after a predetermined time, decreases the command value to a second predetermined value (c) lower than the first predetermined value.

The temporary increase control temporarily increases the command value so that the piston (30) is pressed and driven to the stroke end position.

After executing the temporary increase control (F2), the control device controls the command value so that the driving force of the internal combustion engine is transmitted to the wheels according to the accelerator operation amount signal.

Referring to, e.g., FIG. 7, the control device is capable of receiving an oil temperature signal, and sets a length of the predetermined time and an amount of the increase in the command value for executing the temporary increase control, according to the oil temperature signal.

Referring to, e.g., FIGS. 6B, 8, and 9, the control device is capable of receiving a brake signal of the vehicle, and when the brake signal is turned from on to off, the control device outputs the command value so that the starting engagement friction element (B-2) transfers the creep torque.

The expression "brake signal is turned off" is not limited to the case where a stepping pressure on a foot brake is completely released, but means that the driver intentionally releases the brake to a predetermined stepping amount or less.

The control device executes fast fill control (F1) of filling the hydraulic servo (20) with oil when the brake signal is turned from on to off, and sets the length of the predetermined time and the amount of the increase in the command value for executing the temporary increase control (F2), according to a time from end of the fast fill control to start of the temporary increase control (see, e.g., creep pressure standby time in FIG. 7).

Referring to, e.g., FIG. 8, the control device is capable of receiving a brake signal of the vehicle, and executes fast fill control (F1) of filling the hydraulic servo with oil when the brake signal is turned from on to off, and if the accelerator operation amount signal is turned from off to on before the fast fill control ends, the control device executes the temporary increase control following the fast fill control.

The "fast fill control" means control of filling the hydraulic servo with oil to such an extent that the friction plates slip to generate the creep torque, as shown in, e.g., FIG. 4B. The expression "following the fast fill control" is not limited to the case where the temporary increase control is executed continuously with the fast fill control while a predetermined pressure is maintained, but includes the case where the fast fill control is shifted to the temporary increase control with the oil pressure being changed from the fast fill control.

The control device sets a time during which the temporary increase control is executed so that the time falls in a period from a time the accelerator operation amount signal is turned from off to on to a time engine torque of the internal combustion engine starts increasing.

The reference characters in the parentheses are shown for reference to the drawings, and do not affect the configurations described in the claims in any way.

Effects of the Invention

According to an exemplary aspect of the disclosure, the temporary increase control is immediately executed in response to driver's request for the driving force, with the creep torque having been generated by the starting engagement friction element. In the hydraulic servo, the piston is moved to the stroke end position so that the starting engagement friction element is brought into the state where it starts to be engaged. Thus, an actual oil pressure is supplied to the hydraulic servo of the starting engagement friction element without any delay with respect to the oil pressure command, whereby hesitation (feeling of sluggish acceleration) due to the oil pressure delay can be prevented. Since the oil pressure delay is reduced, an actual driving force obtained by engagement of the starting engagement friction element increases so as to follow the requested driving force, whereby the vehicle can be smoothly started with less shock.

According to another exemplary aspect of the disclosure, the temporary increase control is executed by a single pulse similar to the fast fill control, whereby the piston is quickly moved to the stroke end position in the hydraulic servo.

According to another exemplary aspect of the disclosure, in the temporary increase control, the piston is pressed and driven to the stroke end position. Accordingly, particularly in the case of using friction plates having waves, the creep torque is obtained by contact of the friction plates in the state where the waves are not flattened. By stroking the piston to the stroke end position where the waves are flattened, an engagement oil pressure of the hydraulic servo is immediately applied to the friction plates.

An actual driving force can thus be obtained with high responsiveness without delay.

According to another exemplary aspect of the disclosure, after execution of the temporary increase control, the starting engagement friction element immediately has predetermined torque capacity corresponding to the requested driving force by the driver, and the driving force of the internal combustion engine is accurately transmitted to the driving wheels.

According to another exemplary aspect of the disclosure, the time and the command value of the temporary increase control are set according to the oil temperature signal. Accordingly, the temporary increase control can be executed with high accuracy.

According to another exemplary aspect of the disclosure, the (first) fast fill control is executed in response to turning-off of the brake signal, and in the hydraulic servo, the piston is almost at the stroke end position and the creep torque can be immediately obtained by a creep pressure command.

According to another exemplary aspect of the disclosure, the time and the value of the temporary increase control are set according to the time from the end of the fast fill control. Accordingly, the temporary increase control can be executed with high accuracy.

According to another exemplary aspect of the disclosure, the temporary increase control can be executed even if the accelerator operation amount signal is turned on immediately after the brake signal is turned off, and the (first) fast fill control overlaps the temporary increase control (second fast fill control).

According to another exemplary aspect of the disclosure, the temporary increase control ends by the time the engine torque starts increasing. Accordingly, the temporary increase control does not interfere with the vehicle starting control using the engine torque.

BRIEF DESCRIPTION OF THE DRAWINGS

FIG. 4 shows schematic views showing an engagement friction element using friction plates having waves, where

FIG. 6 show timing charts upon starting, where FIG. 6A is a timing chart illustrating an application of a conventional technique, and FIG. 6B is a timing chart according to the present invention.

FIG. 8 is a timing chart upon starting, showing the state where an accelerator pedal is quickly stepped on after a brake is OFF.

MODES FOR CARRYING OUT THE INVENTION

Figure 1:
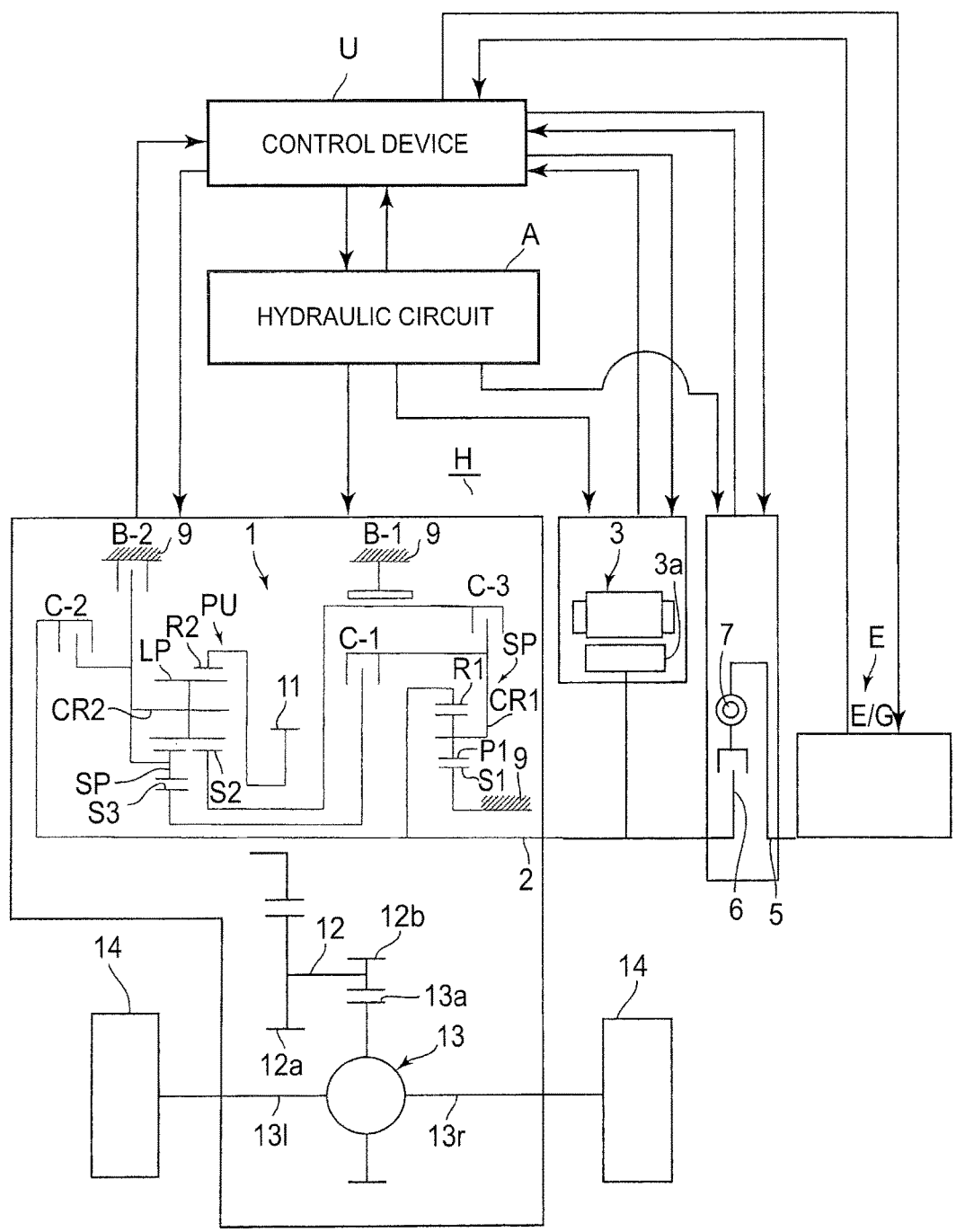
FIG. 1 is a skeleton diagram showing a hybrid vehicle transmission apparatus according to the present invention.

An embodiment of the present invention will be described below with reference to the accompanying drawings. As shown in FIG. 1, a hybrid vehicle transmission apparatus H is formed by a so-called single-motor parallel hybrid drive apparatus that includes an internal combustion engine E and an electric motor 3 as driving sources so that power from these driving sources is transmitted via an automatic transmission device 1 to an output portion 11 connected to driving wheels 14. A rotor 3a of the electric motor 3 is coupled to an input shaft 2 of the automatic transmission device 1, and a clutch 6 and a torsion damper 7 are interposed between the input shaft 2 and an engine output shaft 5. The electric motor 3 functions as a vehicle driving source, a starter (starter motor) that starts the engine, and an alternator (generator) that coverts engine power or inertial force of a vehicle to electric energy.

The input shaft 2 of the automatic transmission device 1 is placed coaxially with the electric motor 3, the clutch 6, and the engine output shaft 5, and the automatic transmission device 1 includes a planetary gear SP and a planetary gear unit PU on the input shaft 2. The planetary gear SP is a so-called single-pinion planetary gear that includes a sun gear S1, a carrier CR1, and a ring gear R1, and that has on the carrier CR1 a pinion P1 meshing with the sun gear S1 and the ring gear R1.

The planetary gear unit PU is a so-called Ravigneaux type planetary gear that has a sun gear S2, a sun gear S3, a carrier CR2, and a ring gear R2 as four rotary elements, and that has on the carrier CR2 a long pinion LP meshing with the sun gear S2 and the ring gear R2 and a short pinion SP meshing with the sun gear S3 such that the long pinion LP meshes with the short pinion SP.

The sun gear S1 of the planetary gear SP is connected to a boss portion, not shown, which is integrally fixed to a transmission case 9 as a fixing member, so that the sun gear S1 is held stationary. The ring gear R1 makes the same rotation (hereinafter referred to as the "input rotation") as that of the input shaft 2. Moreover, the carrier CR1 makes decelerated rotation, which is rotation decelerated from the input rotation, by the sun gear S1 held stationary and the ring gear R1 making the input rotation, and is connected to a clutch C-1 and a clutch C-3.

The sun gear S2 of the planetary gear unit PU is connected to a brake B-1 and is able to be fixed to the transmission case 9. The sun gear S2 of the planetary gear unit PU is also connected to the clutch C-3, so that the sun gear S2 can receive the decelerated rotation of the carrier CR1 via the clutch C-3. The sun gear S3 is connected to the clutch C-1, so that the sun gear S3 can receive the decelerated rotation of the carrier CR1.

Moreover, the carrier CR2 is connected to a clutch C-2 that receives the rotation of the input shaft 2, so that the carrier CR2 can receive the input rotation via the clutch C-2. The carrier CR2 is also connected to a brake B-2 as a starting engagement element, so that the carrier CR2 can be held stationary via the brake B-2. The ring gear R2 is connected to the counter gear 11 as the output portion, and the counter gear 11 meshes with a counter driven gear 12a of a countershaft 12. Moreover, rotation of the countershaft 12 is transmitted to a differential unit 13 via a pinion gear 12b and a differential mount gear 13a, and is transmitted to the driving wheels 14, 14 via left and right axles 13l, 13r.

The hybrid drive transmission apparatus H includes a hydraulic circuit A and a control device U. The hydraulic circuit A communicates with a valve body that operates the automatic transmission device 1 and a lubricating portion of the electric motor 3, and the control device U is electrically connected to the automatic transmission device 1, the electric motor 3, the internal combustion engine E, and the hydraulic circuit A such that signal input and output between the control device U and the automatic transmission device 1, the electric motor 3, the internal combustion engine E, and the hydraulic circuit A.

Figures 2A, 2B:
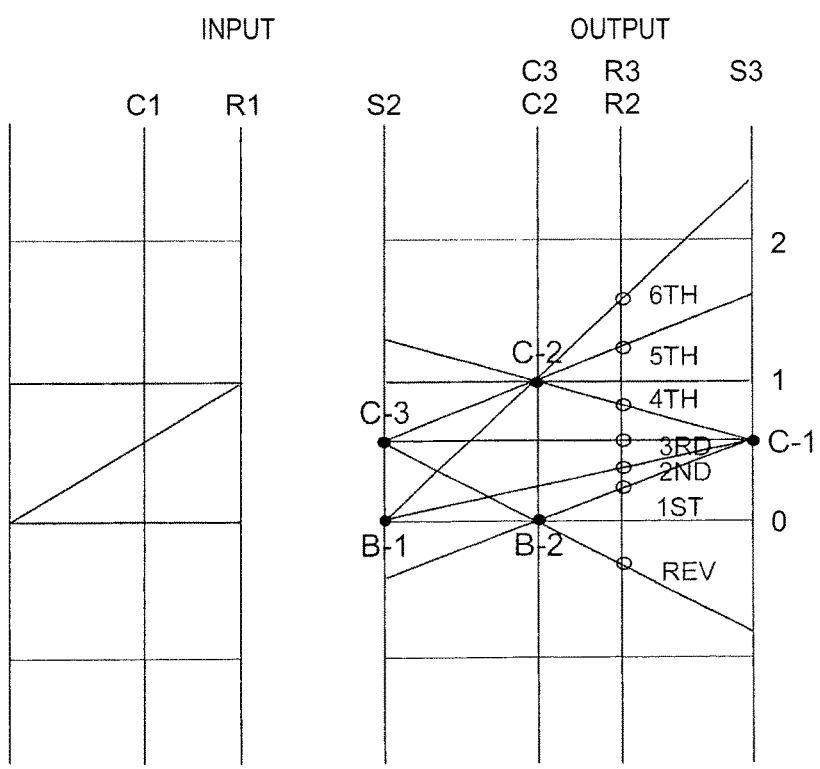
FIG. 2A is an engagement table of an automatic transmission device in the hybrid vehicle transmission apparatus.
FIG. 2B is a speed diagram thereof.

The automatic transmission device 1 having the above configuration attains first (1st) to sixth (6th) forward speeds and a reverse speed (Rev) as shown by the speed diagram of FIG. 2B by engagement and disengagement of the clutches C-1 to C-3 and the brakes B-1, B-2 shown in the skeleton diagram of FIG. 1 according to the combinations shown in the engagement table of FIG. 2A.

The brake B-2 is a brake that operates at the first and reverse speeds. The brake B-2 is engaged upon starting of the vehicle, and is slip controlled upon starting of the engine by the electric motor 3. That is, the vehicle is brought into a first-speed state by engaging the clutch C-1 and engaging the brake B-2. In the first-speed state, the rotation of the input shaft 2 is decelerated by the engagement of the clutch C-1, and the decelerated rotation is transmitted to the sun gear S3 of the planetary gear PU. Since the carrier CR2 is in a stopped state by the brake B-2, the decelerated rotation is further decelerated to be output from the ring gear R2 to the counter gear 11. Normally, when starting the vehicle at the first speed, the clutch 6 is disconnected and the engine is in a stopped state, and the vehicle is driven by the electric motor 3.

The engine E is started in the first-speed state after the vehicle is started. At this time, with the brake B-2 being slip controlled to absorb the rotation difference between the input and output shafts of the automatic transmission device 1, torque of the electric motor 3 is increased, and the clutch 6 is connected to rotate the internal combustion engine E.

There are cases where the vehicle cannot be started by the electric motor 3, such as the case of low battery charge or the case where the clutch 6 is connected to drive the electric motor 3 by the engine E and a battery is charged by using the electric motor as a generator. In this state, the vehicle is started by the engine E. At this time, the brake B-2 to be engaged at the first speed is used as a starting clutch, and the brake B-2 is slip controlled to generate creep torque. In this state, an engagement pressure is supplied to engage the brake B-2. The vehicle is thus brought into the first-speed state and is started.

Figure 3:
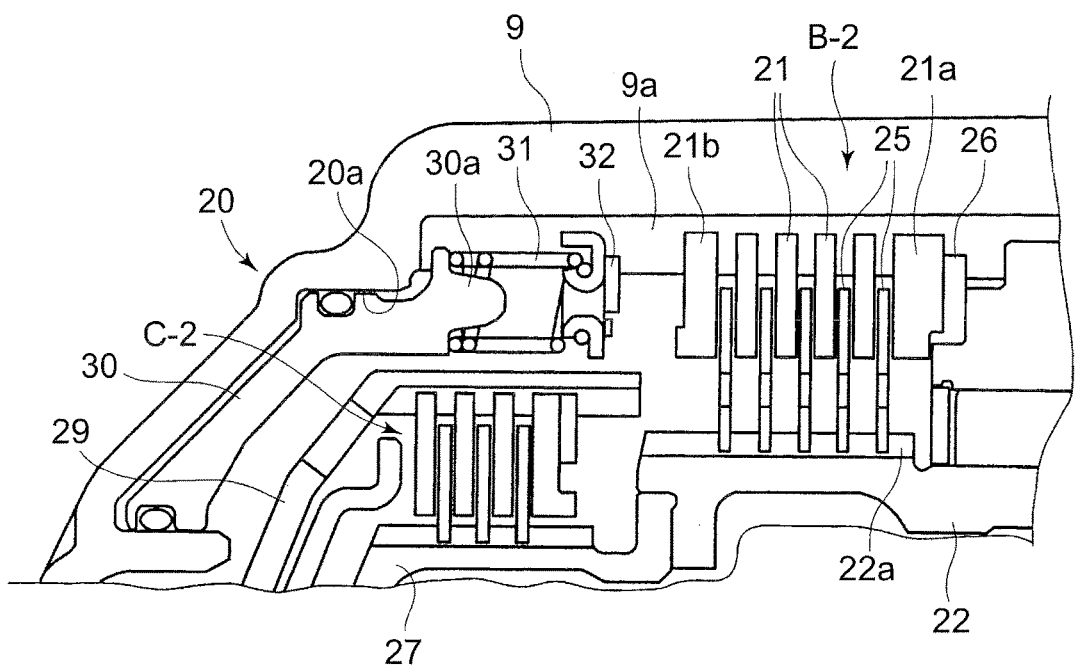
FIG. 3 is a sectional view showing a B-2 brake as a starting engagement element and a hydraulic servo thereof.

The brake B-2 as the starting engagement element and a hydraulic servo 20 thereof will be described with reference to FIG. 3. The brake B-2 is formed by a multi-plate wet friction plate in which outer friction plates (separator plates) 21 having, on their outer peripheral surfaces, teeth that are engaged with inner splines 9a of the case 9 and inner friction plates (discs) 25 having, on their inner peripheral surfaces, teeth that are engaged with splines 22a of a hub 22 are alternately arranged side by side in the axial direction. One end of a plurality of the outer friction plates 21 is formed of an end plate 21a that is retained by a snap ring 26, and a pressure plate 21b is placed on the hydraulic piston side of the outer friction plates 21.

The hub 22 is integrally fixedly attached to a case 27 of the carrier CR2 by welding etc., and the planetary gear unit PU is placed in the hub 22 and the case 27. The clutch C-2 as a multi-plate wet clutch is placed between the carrier case 27 and a drum 29 extending from the input shaft 2. A cylinder 20a forming the hydraulic servo 20 is formed inward of the side surface of the front end of the case 9, and a piston 30 is fitted in the cylinder 20a in an oil-tight manner. A piston rod 30a is integrally formed so as to extend from the piston 30 toward the pressure plate 21b of the brake B-2. The piston rod 30a is formed in the shape of comb teeth, and a return spring 31 placed between the comb teeth is disposed between the piston rod 30a and a snap ring 32 retained by the case 9.

Figure 4A:
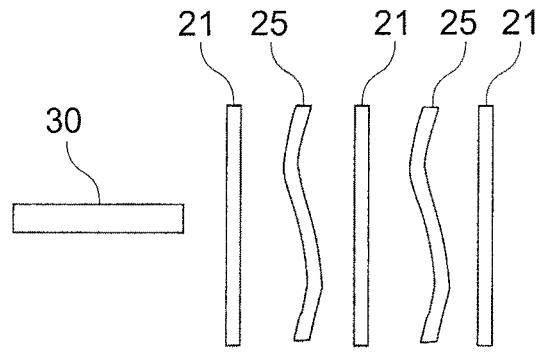
FIG. 4A shows a disengaged state.
Figure 4B:
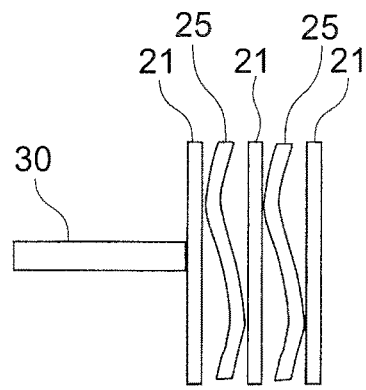
FIG. 4B shows a creep (slip) state.

As schematically shown in FIG. 4, each inner friction plate (disc) 25 of the brake B-2 is formed in a wave shape and is placed between the outer friction plates (separator plates) 21. As shown in FIG. 4A, in a disengaged non-driving state (creep cut state), each disc 25 thus has the wave shape as a natural state and is separated from the separator plates 21 (no-pressure state), and torque capacity is 0. As shown in FIG. 4B, a creep pressure is supplied to the hydraulic servo 20, and the piston 30 is moved to a predetermined position. Each disc 25 maintaining its wave shape thus contacts the separator plates 21 with a predetermined pressure. In this state, slip control is performed in which the discs 25 in the wave state contact the separator plates 21, attaining a creep state having predetermined torque capacity corresponding to the creep torque.

Figure 4C:
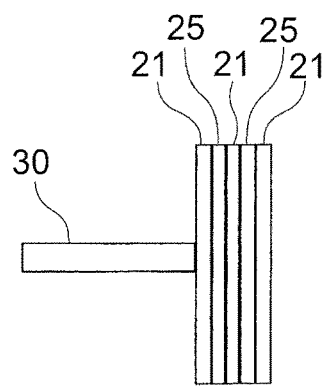
FIG. 4C shows a driving-force transmitting (engaged) state.

FIG. 4C shows the state where the piston 30 has been moved from the creep state to a stroke end position. In this state, the wave shape of each disc 25 is flattened into a flat plate state between the separator plates 21, attaining a driving-force transmitting state (engaged state) having torque capacity according to an engagement pressure applied to the piston 30. The piston stroke from the disengaged state of FIG. 4A to the creep state of FIG. 4B corresponds to first (1st) fast fill (control) described below, and the piston stroke to the driving-force transmitting state of FIG. 4C corresponds to second (2nd) fast fill (control) described below.

Figure 5:
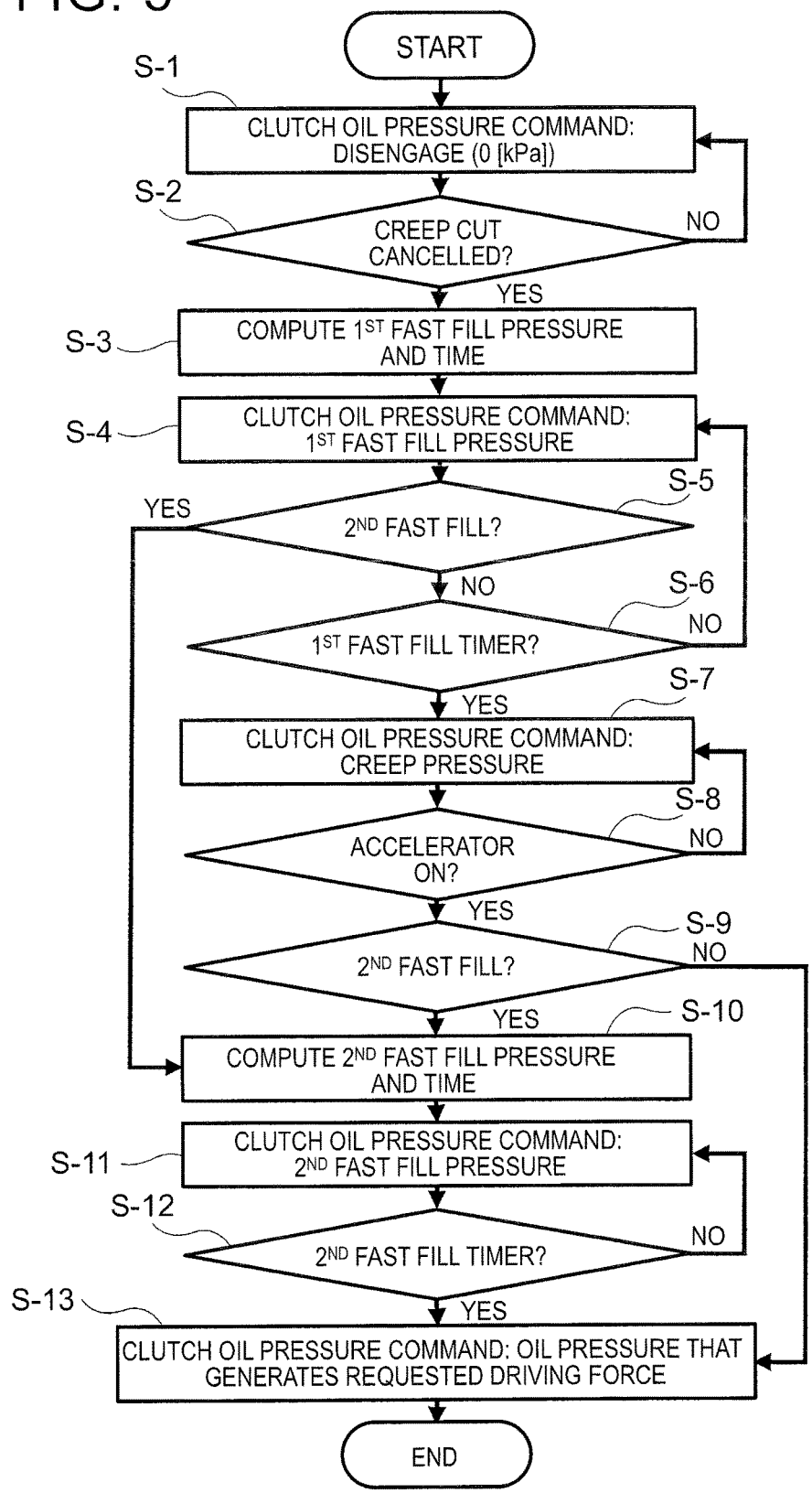
FIG. 5 is a diagram showing a hydraulic control flow of a starting engagement friction element (clutch).

Starting control that is performed when starting the vehicle by using the engine E as the driving source will be described with reference to FIGS. 5 and 6. First, in the case where the vehicle is in a stopped state with a foot brake being stepped on by the driver, the clutch C-1 is in an engaged state even if there is a command for the first-speed state in D range. However, a clutch oil pressure command for the brake B-2 as the starting engagement element (the brake is sometimes referred to as the clutch as a meaning of the engagement friction element; the same applies to the following description) indicates a disengaged state (0 [KPa]) (S-1). If, from this state, the driver releases the stepping pressure on the foot brake with the vehicle being at 10 rpm or less, namely in the stopped state, and the stepping amount of the brake reaches 20% or less, it is determined that the driver has prepared to start the vehicle. That is, it is determined that the brake B-2 has been released from the creep cut state or the disengaged state of FIG. 4A (S-2; YES).

The control device U computes a first (1st) fast fill pressure and an operation time of the first fast fill (S-3), and outputs a pulsed fast fill command pressure to a linear solenoid valve of the hydraulic circuit A (S-4). The first (1st) fast fill pressure and time are determined by a map based on the creep cut duration and the oil temperature.

Then, it is determined if the second (2nd) fast fill should be executed (S-5). In the starting condition of FIG. 6 in which the time from brake OFF to accelerator ON is a predetermined time, the determination result in step S-5 is NO. It is therefore determined if the time for the first (1st) fast fill set in step S-4 has passed (S-6). During the 1st fast fill time, the fast fill command pressure is maintained, and the fast fill pressure is supplied to the hydraulic servo 20 to fill the hydraulic servo 20 with oil. As shown in FIG. 4B, the piston 30 is thus moved by a predetermined amount so that the wave discs 25 contact the separator plates 21 while being maintained in the wave state. After the time for the first (1st) fast fill has elapsed (S-6; YES), the control device U outputs a command for a creep pressure a (see FIG. 6B), and the linear solenoid valve of the hydraulic circuit A outputs the creep pressure a to the hydraulic servo 20 to generate creep torque (S-7).

In the brake B-2, the wave discs 25 thus partially contact the separator plates 21 by the creep pressure in the state shown in FIG. 4B, and the creep torque is generated, bringing the vehicle into the state where it can creep (creep state). This creep state is maintained until the driver steps on an accelerator pedal. If the driver steps on the accelerator pedal (accelerator ON) (S-8; YES), it is determined if the second (2nd) fast fill (control) should be executed (S-9). The accelerator ON may be determined by the accelerator operation amount having been changed from 0, or by a switch that is switched between ON and OFF by the accelerator pedal. In either case, the determination result is defined as ON/OFF of an accelerator operation amount signal.

Whether the 2nd fast fill (temporary increase control) should be executed or not is determined in steps S-5 and S-9 by using a requested driving force before the accelerator is stepped on, a past execution determination history, and a rate of change of the requested drive force resulting from stepping on the accelerator. Specifically, it is determined that the 2nd fast fill should be executed, if the requested driving force is 50 [Nm] or less, i.e., the requested driving torque is less than the torque that is obtained when the piston reaches the end of the stroke, if there is no fast fill history during the last 12 seconds, i.e., a sufficient period of time has elapsed so that control hunting will not occur, and a gradient of the requested driving force is 200 [Nm/s] or more, i.e., the gradient of the requested driving force is such a gradient that it can be determined that the accelerator has been stepped on. The determination that the 2nd fast fill should be executed can be made not only when all of the above three requirements are satisfied, but can be made based only on the gradient of the requested driving force. Moreover, although the gradient of the requested driving force is typically determined by an accelerator opening angle signal, the present invention is not necessarily limited to the accelerator opening angle signal, and as in step S-8, the gradient of the requested driving force may be determined by the ON/OFF switch that detects stepping-on of the accelerator pedal or by operation of a component other than the accelerator pedal. In other words, the gradient of the requested driving force need only be determined by detecting driver's operation of requesting a driving force with intent to start the vehicle. If the determination result is YES in step S-9, the control device U sets a 2nd fast fill command pressure and time by a map based on the creep pressure standby time and the oil temperature (S-10). Specifically, the 2nd fast fill pressure is set so as to decrease with an increase in oil temperature and to decrease with an increase in creep standby time. The fast fill time is set so as to decrease with an increase in oil temperature. Setting of the 2nd fast fill pressure and time is not limited to the above, and both the 2nd fast fill pressure and time may be set by the creep standby time and the oil temperature, or may be set by only one of the creep standby time and the oil temperature. The fast fill pressure may be set so as to increase with an increase in creep standby time.

Figure 7A:
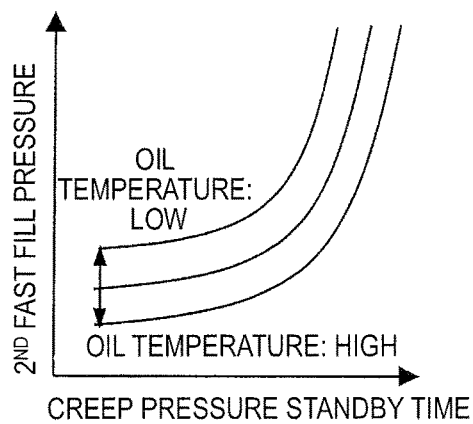
FIGS. 7A and 7B are schematic diagrams showing the difference in 2nd fast fill pressure with respect to a creep pressure standby time in the automatic transmission device.
Figure 7B:
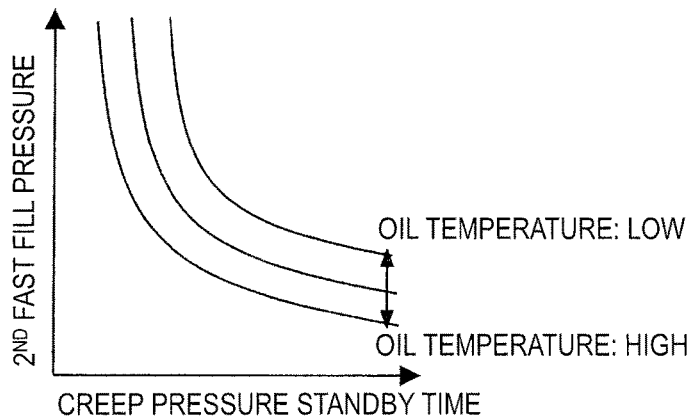

FIG. 7 shows diagrams illustrating that setting of the 2nd fast fill pressure varies depending on the model or individual characteristics of the automatic transmission device. FIG. 7A shows the case of an automatic transmission device with a large amount of oil leakage from a hydraulic servo, in which the 2nd fast fill pressure is set so as to increase with an increase in creep pressure standby time in order to compensate for the oil leakage from the hydraulic servo. FIG. 7B shows the case of an automatic transmission device with a small amount of oil leakage from a hydraulic servo, in which the 2nd fast fill pressure is set so as to decrease with an increase in creep pressure standby time as the hydraulic servo is filled with oil by supply of the creep pressure thereto. In either case, an oil temperature signal has been input from an oil temperature sensor to the control device, and the 2nd fast fill pressure is set so as to decrease with an increase in oil temperature.

The command value set in step S-10 is output from the control device U to the linear solenoid valve of the hydraulic circuit A (S-11), and the 2nd fast fill pressure is maintained until the time computed in step S-10 passes. As shown in FIG. 4C, the piston 30 is moved by the 2nd fast fill pressure to the stroke end position so that each wave disc 25 is flattened between the separator plates 21 into a flat plate shape. The command value of the 2nd fast fill control (temporary increase control) F2 (see FIG. 6B) has a single pulse shape that instantaneously increases from the value (creep torque pressure) a as a command to transfer the creep torque to a first predetermined value b, and after the predetermined time (after a 2nd fast fill timer has elapsed), instantaneously decreases to a second predetermined value c lower than the predetermined value b. The second predetermined value c corresponds to the torque capacity immediately before a driving force for starting the vehicle is obtained with the waves of the wave discs 25 being flattened into the flat plate state. The 2nd fast fill is set so as to end between the time a driving force request rises and the time the driving force source (engine) generates a driving force. If the 2nd fast fill time measured by the timer has passed in step S-12 (YES), a command for a clutch (brake) engagement pressure based on the requested driving force is output, the brake B-2 is engaged by the oil pressure generating the requested driving force, and the vehicle is started in the first-speed state (S-13).

FIG. 6 shows timing charts illustrating starting control, where FIG. 6A shows a conventional technique applied to this hybrid vehicle transmission apparatus, and FIG. 6B is based on the flowchart described above. FIGS. 6A and 6B are different from each other in that there is the second (2nd) fast fill control F2 in FIG. 6B. In FIG. 6A based on the conventional technique, the creep pressure rises quickly by the first (1st) fast fill control F1, whereby predetermined creep torque is obtained. Since there is no second (2nd) fast fill control F2, an actual oil pressure from the hydraulic circuit A to the brake B-2 is subjected to significant delay D1 with respect to an oil pressure command based on requested driving force from the control device U, and an actual driving force rate E1 rises abruptly. That is, oil pressure delay corresponding to such a change in volume of the hydraulic servo that is required to move the piston 30 to the stroke end position so that the waves of the wave discs 25 are flattened is caused during the movement from FIG. 4B to FIG. 4C. This results in hesitation or feeling of sluggish acceleration. Due to the delay D1, the actual driving force rate E rises abruptly so that the actual driving force becomes closer to the requested driving force. The driver thus feels the shock.

On the other hand, the starting control of the present invention shown in FIG. 6B has the second (2nd) fast fill control F2. Accordingly, in the fast fill control F2, the piston 30 is moved to the stroke end position where each wave disc 25 is flattened into a flat plate shape between the separator plates 21 as shown in FIG. 4C. An increase in oil pressure that is applied to the hydraulic servo 20 therefore immediately serves as a driving force by the engagement force of the brake B-2, and an actual oil pressure rises quickly due to slight delay D2 based on response delay of the engine. The driving force thus rises smoothly so as to follow the requested driving force, and neither shock nor hesitation is caused. The vehicle is thus smoothly started without causing the driver to experience discomfort.

FIG. 8 is a timing chart showing the case where the accelerator pedal is quickly stepped on immediately after the foot brake is OFF, and thus the first (1st) fast fill (control) overlaps the second (2nd) fast fill (control). In FIG. 5, while the command for the 1st fast fill is output in step S-4, it is determined YES in step S-5 regarding the 2nd fast fill in the state where time measurement by the 1$^{st}$ fast fill timer in step S-6 has not been finished. That is, immediately after the stepping amount of the foot brake becomes 20% or less and the creep pressure is generated by the 1st fast fill F1, the driver steps on the accelerator pedal. When the gradient of the requested driving force becomes 200 [Nm/s] or more, the 2nd fast fill control is executed during the 1st fast fill control.

Since the determination result of step S-5 is YES, the routine proceeds to step S-10, where the control device U sets the 2nd fast fill pressure and time. At this time, the oil pressure of the 2nd fast fill F2 (shown by solid line) is changed with respect to scheduled 2nd fast fill F2' (shown by dotted line in the B-2 oil pressure of FIG. 8) that is set by the map described above, based on overlap time T1 between the 1st fast fill F1 and the scheduled 2nd fast fill F2'. The end time of the 2nd fast fill F2 is set to be the same as the scheduled fast fill F2' that is set by the map described above. The 2nd fast fill F2 is therefore shorter than the scheduled fast fill F2' by the overlap time T1, and the oil pressure of the 2nd fast fill F2 is thus set to be higher than the scheduled fast fill by a predetermined amount h. Accordingly, even if the 1st fast fill F1 overlaps the 2nd fast fill F2, the piston 30 is moved to the stroke end position shown in FIG. 4C by the 2nd fast fill F2, so that the brake B-2 can quickly increase an actual oil pressure according to the oil pressure command value. Therefore, an actual driving force also smoothly increases so as to follow the requested driving force, whereby the vehicle is started.

Figure 9:
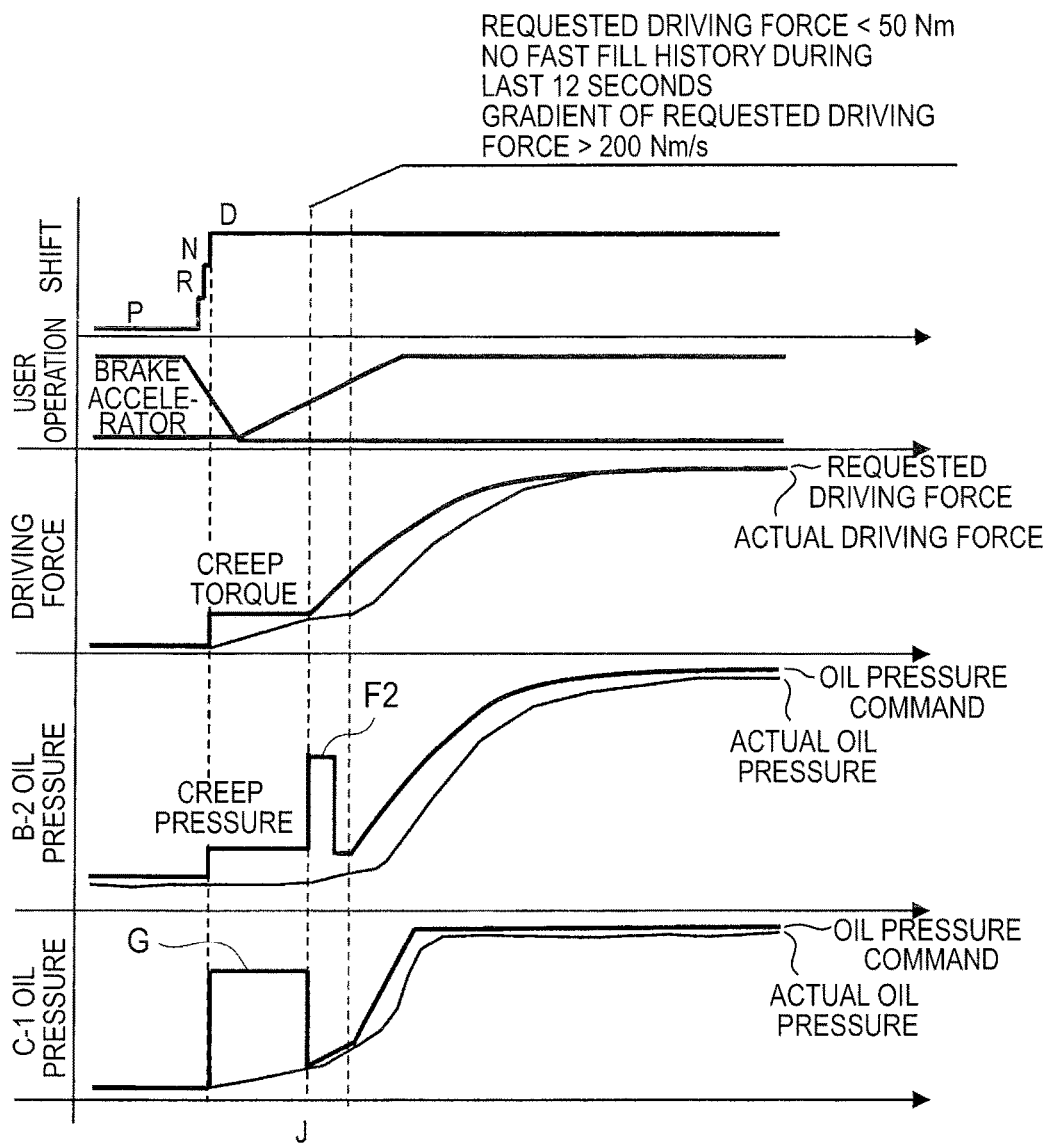
FIG. 9 is a timing chart upon starting, showing the state where the accelerator pedal is stepped on immediately after P to D garage shift.

FIG. 9 is a timing chart of the case where a PD garage shift overlaps starting control, namely the case where the accelerator pedal is stepped on immediately after a garage shift from P range to D range. The driver releases the foot brake and quickly shifts the vehicle in P range to D range via R and N ranges. In this state, the automatic transmission device 1 is shifted from P or N range to the D-range, first-speed state. Accordingly, an oil pressure is supplied to the brake B-2 and the clutch C-1. At this time, although fast fill is required to be performed on both hydraulic servos of the B-2 brake and the C-1 clutch, the fast fill control cannot be simultaneously performed on both hydraulic servos due to limitation on the flow rate of the oil pump.

Accordingly, immediately after the shift operation from P range to D range, fast fill control of the clutch C-1 is first executed such that the clutch C-1 is operated with the piston in the stroke end position. At this time, even if the accelerator pedal has been stepped on, the requested driving force limits the driving force until the clutch C-1 reaches a predetermined oil pressure command J. A creep torque request has been output, and a creep pressure command that can be executed with a small amount of oil is output and with the 1st fast fill being not performed on the brake B-2. If it is determined that the fast fill control (with the piston in the stroke end position) G of the clutch C-1 has been finished (J), the limitation on the driving force is removed. If it is determined with the limitation on the driving force being removed that the 2nd fast fill for the brake B-2 should be executed, the 2nd fast fill F2 is controlled by the fast fill pressure and time in a manner similar to that described above.

The vehicle is thus smoothly started without causing hesitation and shock even when the PD garage shift overlaps the starting control.

Figure 10:
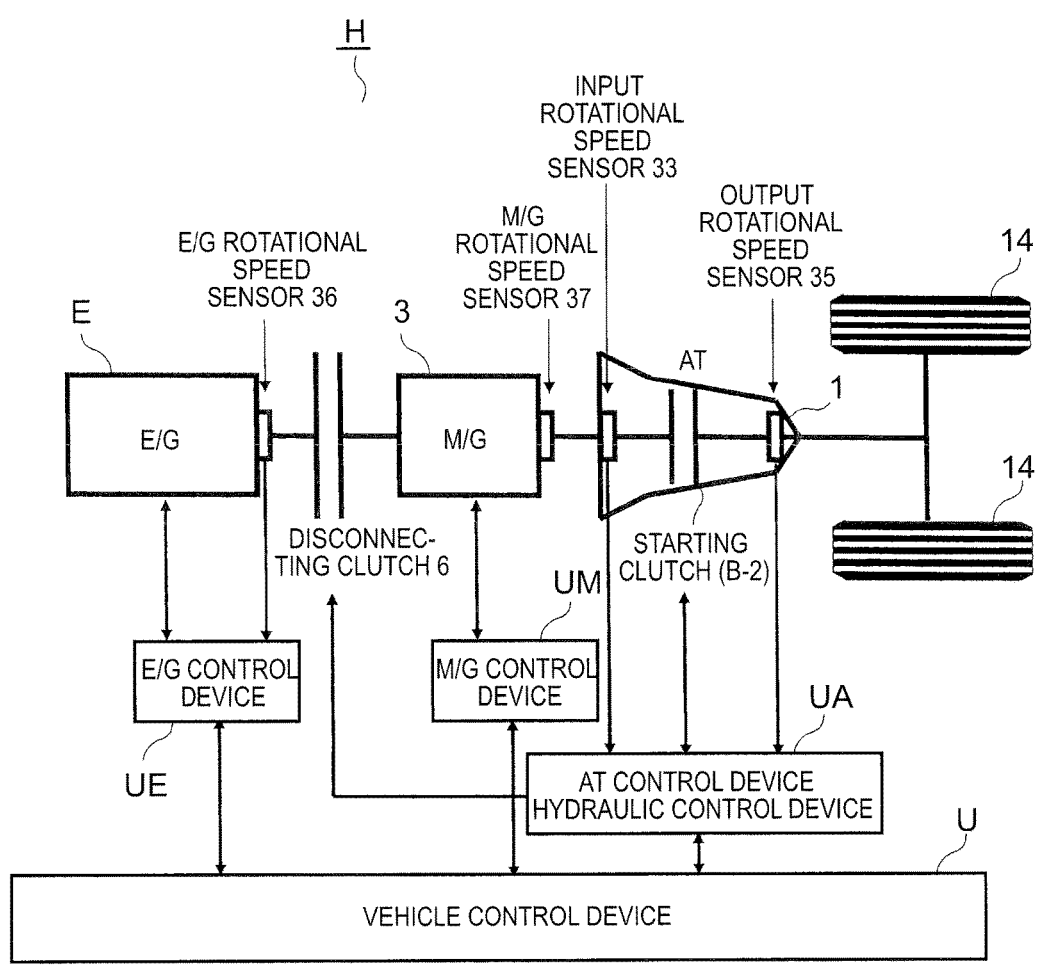
FIG. 10 is a schematic diagram showing a vehicle transmission apparatus according to an embodiment that is applied to a hybrid vehicle.

FIG. 10 is a schematic diagram of the hybrid vehicle transmission apparatus H described above. The disconnecting clutch 6 is interposed between the engine E and the electric motor 3, and is connected from the electric motor 3 to the driving wheels 14 via the automatic transmission device 1. An output-shaft rotational speed sensor 36 for the engine E is placed in the engine E, an output-shaft rotational speed sensor 37 for the electric motor 3 is placed in the electric motor 3, and an input rotational speed sensor 33 and an output rotational speed sensor 35 are placed in the automatic transmission device 1.

The hybrid vehicle transmission apparatus H includes an engine control device UE that controls the engine E, an M/G control device UM that controls the electric motor 3, and an AT control device/hydraulic control device UA that controls the automatic transmission device 1 and the disconnecting clutch 6. These control devices are connected to the vehicle control device U for integration control.

The above embodiment is described with respect to the case where the brake B-2 of the automatic transmission device 1 which is to be engaged at the first speed serves as a starting engagement friction element (starting clutch). However, the disconnecting clutch 6 may be used as a starting clutch, and the starting control by the brake B-2 may be applied as it is to the clutch 6.

Figure 11:
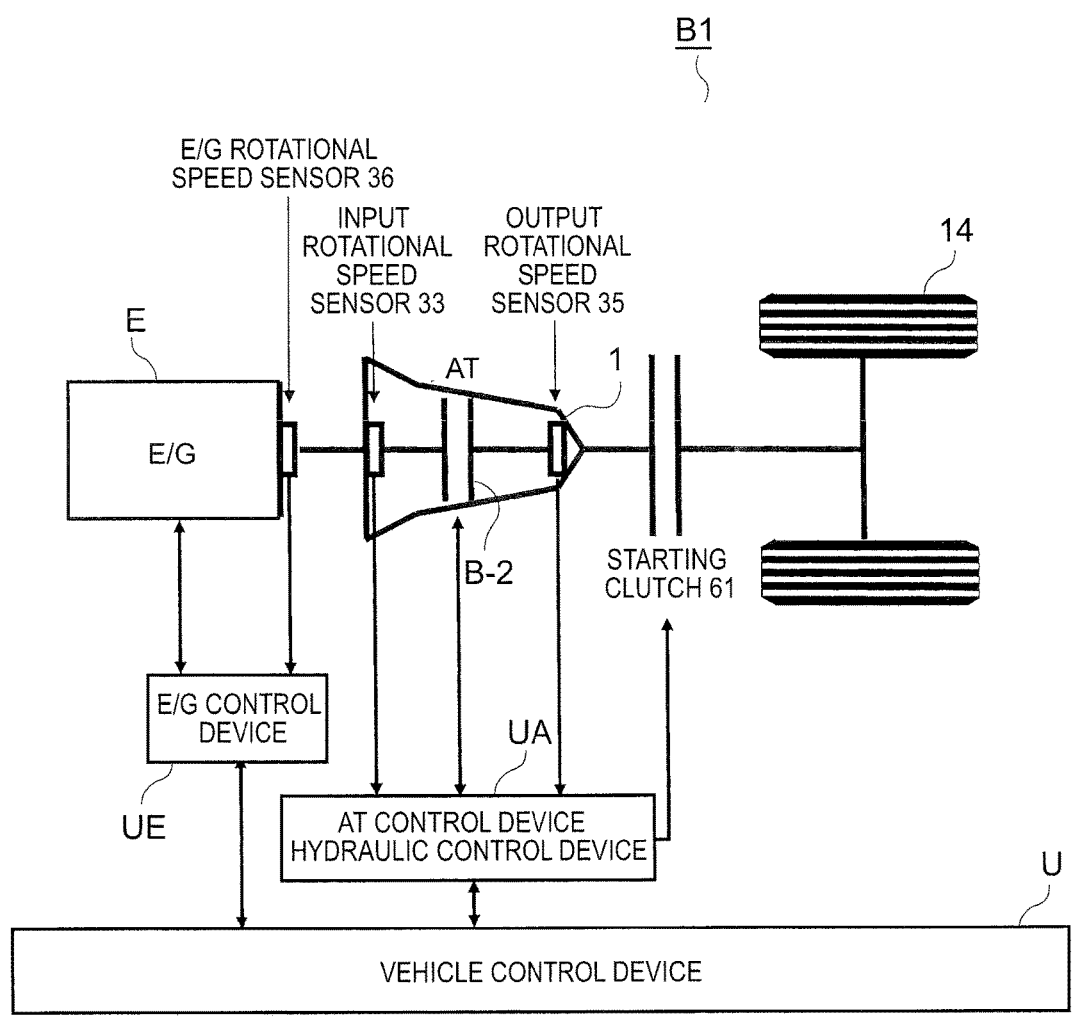
FIG. 11 is a schematic diagram showing a vehicle transmission apparatus according to another embodiment.

FIG. 11 shows a vehicle transmission apparatus B1 that uses a normal engine and does not include an electric motor. The vehicle transmission apparatus B1 has a starting clutch 61 interposed between the automatic transmission device 1 and the driving wheels 14. The starting control described above can be similarly applied to the vehicle transmission apparatus B1 by using the engagement friction element of the automatic transmission device 1 which is to be engaged at the first speed, e.g., the brake B-2, as a starting engagement friction element, or by using the starting clutch 61 as a starting engagement friction element. The starting clutch 61 may be omitted in the case where the engagement friction element (e.g., the brake B-2) of the automatic transmission device 1 is used as a starting engagement friction element.

Figure 12:
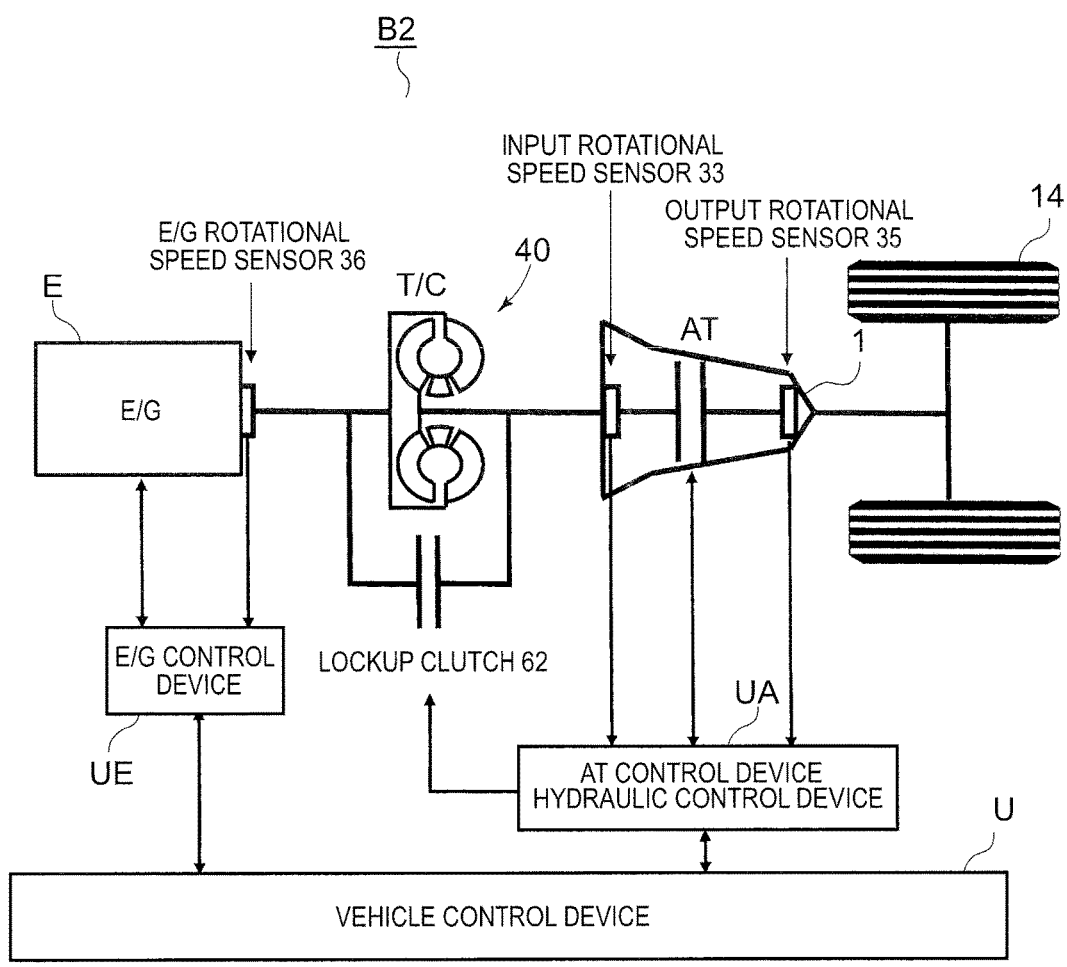
FIG. 12 is a schematic diagram showing a vehicle transmission apparatus according to still another embodiment.

FIG. 12 is a schematic diagram showing a vehicle transmission apparatus B2 that also does not have an electric motor. A torque converter 40 having a lockup clutch 62 is placed between the engine E and the automatic transmission device 1. In the case where starting control is performed in a sport mode etc. with the lockup clutch 62 being connected in the vehicle transmission apparatus B2, the starting control can be applied in a manner similar to that described above by using the engagement friction element of the automatic transmission device 1 which is to be engaged at the first speed, e.g., the brake B-2, as a starting engagement friction element as described above. In the case where the vehicle is started by slip controlling the lockup clutch 62 in order to prevent revving up of the engine to improve fuel economy, and to obtain feeling of direct engagement, the above starting control can be similarly applied by using the lockup clutch 62 as a starting engagement friction element.

The above embodiments are described with respect to the case where the starting engagement friction element is formed by friction plates having waves. However, the present invention is similarly applicable to a starting engagement friction element formed by friction plates having no such waves.

INDUSTRIAL APPLICABILITY

The present invention is applicable to vehicle transmission apparatuses such as hybrid vehicle transmission apparatuses having an engine and an electric motor as driving sources.

DESCRIPTION OF THE REFERENCE NUMERALS

1 Automatic Transmission device
3 Electric Motor
E Internal Combustion Engine
U Control Device
H Hybrid Vehicle Transmission Apparatus
B1, B2 Vehicle Transmission Apparatus
B-2 Starting Engagement Friction Element
14 Driving Wheel
20 Hydraulic Servo
21 (Outer) Friction Plate (Separator Plate)
25 (Inner) Friction Plate (Wave Disc)
30 Piston
30a Piston Rod
F1 (First) (1st) Fast Fill Control
F2 Temporary Increase Control [(Second) (2nd) Fast Fill Control]

The invention claimed is:

1. A vehicle transmission apparatus, wherein:
   a starting engagement friction element, which has friction plates and a hydraulic servo including a piston that is moved according to a supplied oil pressure to press the friction plates, which is placed on a transmission path between an internal combustion engine and wheels, which is controlled to be engaged when a vehicle is started by using at least a driving force of the internal combustion engine, and which transfers creep torque that allows the vehicle to creep before the piston reaches a stroke end position; and
   a control device capable of receiving an accelerator operation amount signal and capable of outputting a command value that controls the oil pressure, wherein
   when the accelerator operation amount signal is turned on from a state where the accelerator operation amount signal is off and the command value is outputted so that a position of the piston is between a disengaged position, in which the starting engagement friction element is brought into a disengaged state, and the stroke end position in order to transfer the creep torque by the starting engagement friction element, the control device executes temporary increase control of temporarily increasing the command value to a first predetermined value so that the piston is pressed and driven to the stroke end position from the position between the disengaged position, in which the starting engagement friction element is brought into the disengaged state, and the stroke end position; and
   after a predetermined time, the control device decreases the command value to a second predetermined value; and
   the first predetermined value is determined based on a creep standby time.

2. The vehicle transmission apparatus according to claim 1, wherein
   the control device is capable of receiving an oil temperature signal, and sets a length of the predetermined time and an amount of the increase in the command value for executing the temporary increase control, according to the oil temperature signal.

3. The vehicle transmission apparatus according to claim 1, wherein
   the control device is capable of receiving a brake signal of the vehicle, and when the brake signal is turned from on to off, the control device outputs the command value so that the starting engagement friction element transfers the creep torque.

4. The vehicle transmission apparatus according to claim 3, wherein
   the control device executes fast fill control of filling the hydraulic servo with oil when the brake signal is turned from on to off, and sets a length of the predetermined time and an amount of the increase in the command value for executing the temporary increase control, according to a time from end of the fast fill control to start of the temporary increase control.

5. The vehicle transmission apparatus according to claim 1, wherein
   the control device is capable of receiving a brake signal of the vehicle, and executes fast fill control of filling the hydraulic servo with oil when the brake signal is turned from on to off, and if the accelerator operation amount signal is turned from off to on before the fast fill control ends, the control device executes the temporary increase control following the fast fill control.

6. The vehicle transmission apparatus according to claim 1, wherein
   the control device sets a time during which the temporary increase control is executed so that the time falls in a period from a time the accelerator operation amount signal is turned from off to on to a time engine torque of the internal combustion engine starts increasing.

* * * * *